April 21, 1970  E. STÄDELE  3,507,047
NIL GAUGING DEVICE FOR MACHINE TOOLS
Filed Feb. 3, 1967  6 Sheets-Sheet 1

INVENTOR
ERHARD STÄDELE
BY
ATTORNEY

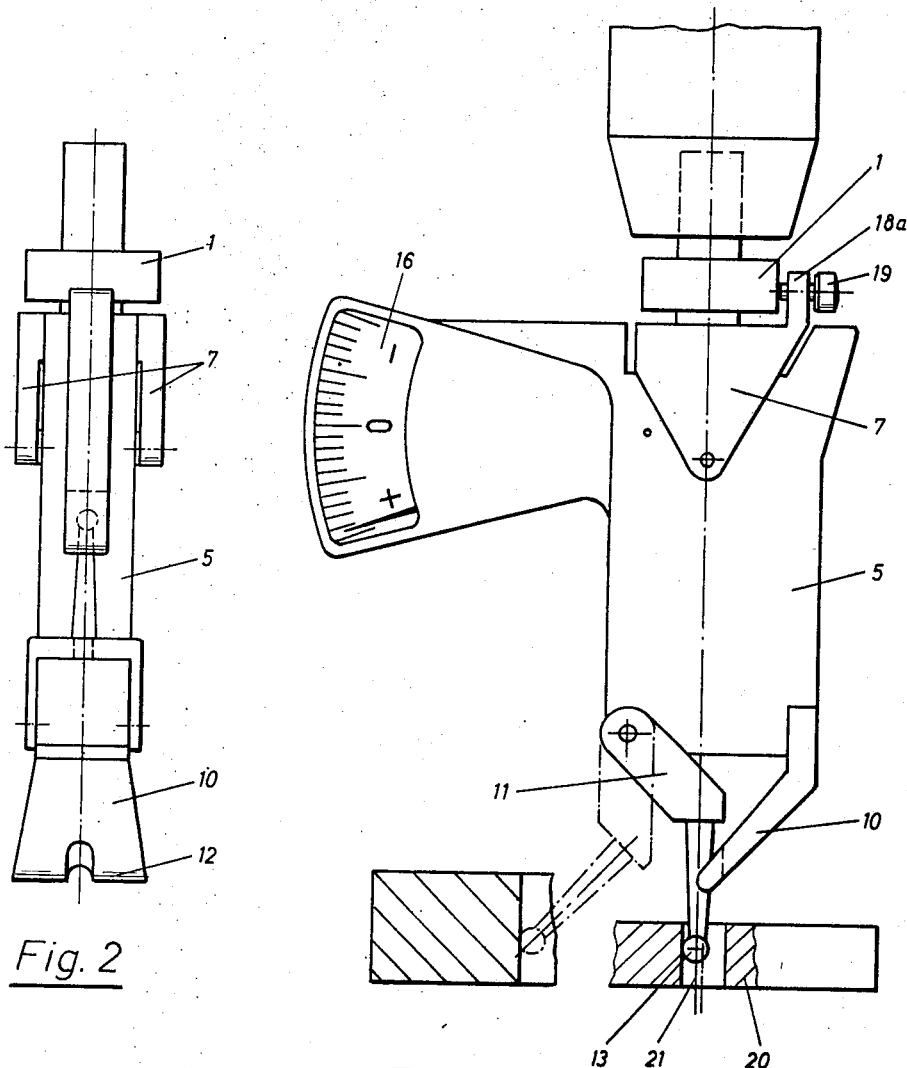

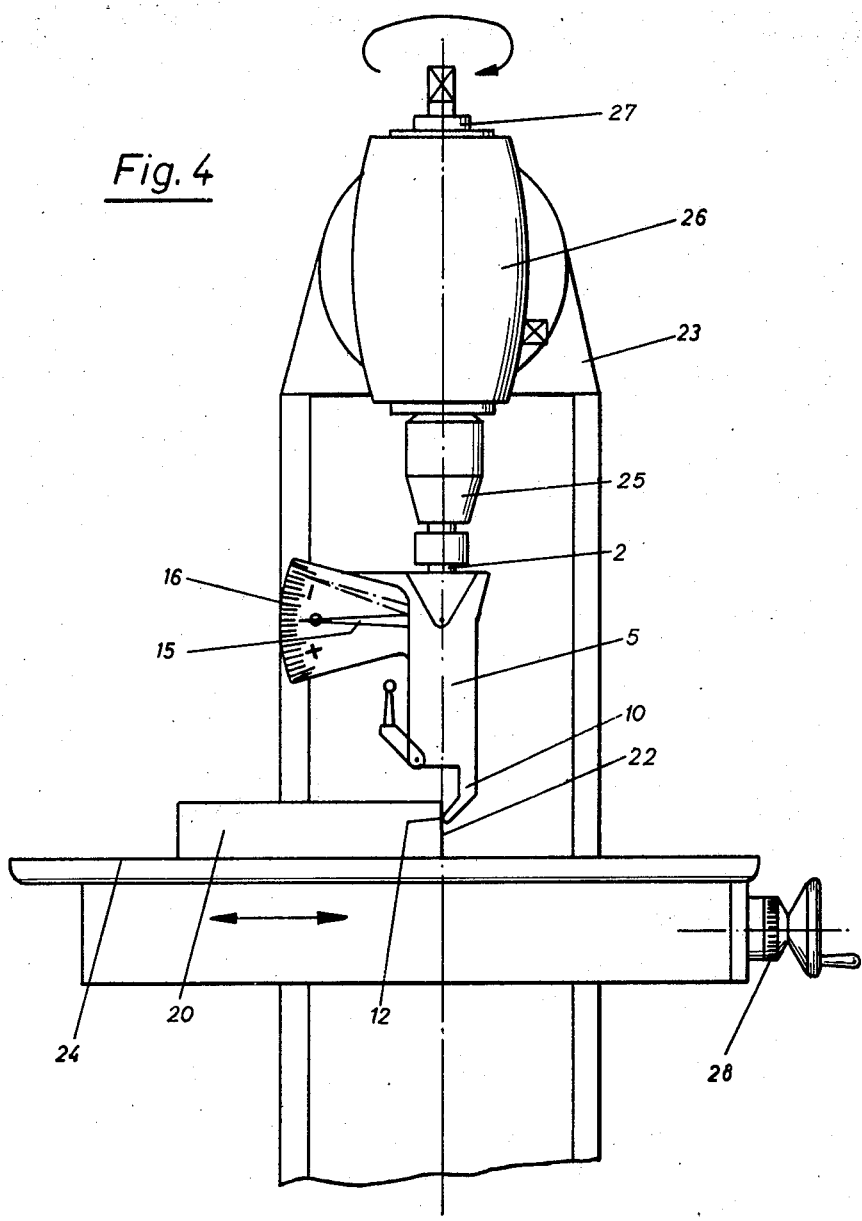

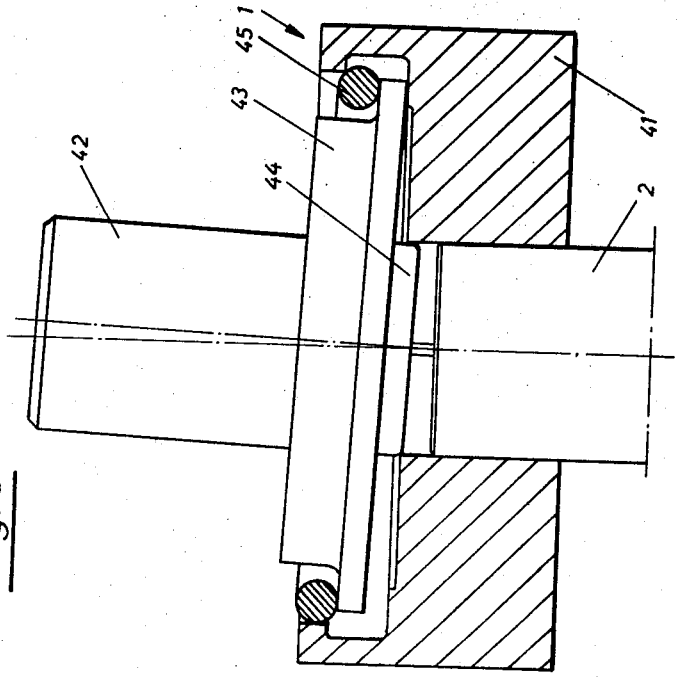
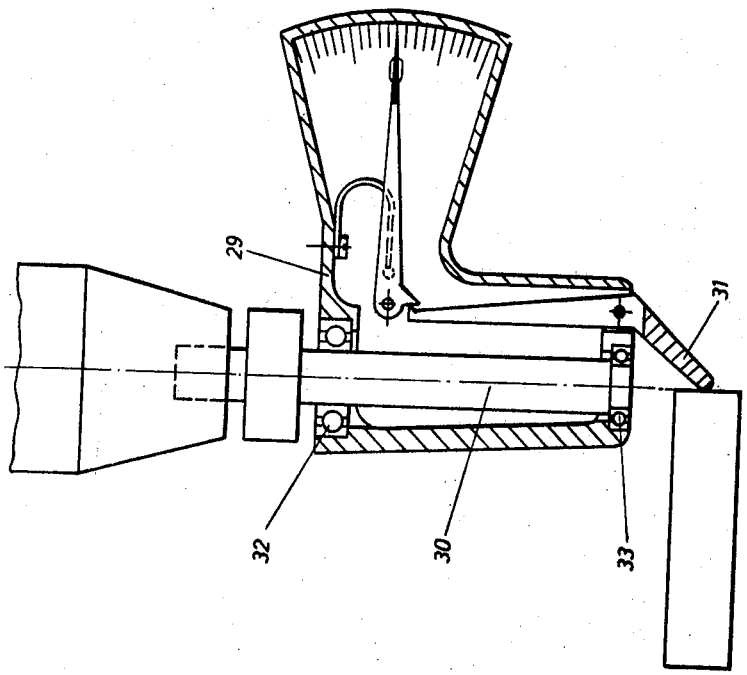

April 21, 1970     E. STÄDELE     3,507,047
NIL GAUGING DEVICE FOR MACHINE TOOLS
Filed Feb. 3 1967     6 Sheets-Sheet 6

INVENTOR
ERHARD STÄDELE
BY Charles E. Baxley
ATTORNEY

United States Patent Office 3,507,047
Patented Apr. 21, 1970

3,507,047
NIL GAUGING DEVICE FOR MACHINE TOOLS
Erhard Städele, Bermatingen, Bondensee, Germany
Filed Feb. 3, 1967, Ser. No. 613,776
Claims priority, application Germany, Feb. 4, 1966,
St 24,950
Int. Cl. G01b 3/22
U.S. Cl. 33—172
7 Claims

ABSTRACT OF THE DISCLOSURE

In a nil gauge device for machine tools and for setting up milling machines, jig drilling machines or the like a reference mandrel is inserted in a chuck or clamping jaws so the axis of the mandrel is aligned with that of the machine tool and a housing is rotatably mounted about the mandrel and is arranged to pivot in planes which include the mandrel axis. The housing carries a feeler to bear on the work piece which is being gauged and the position of the feeler in relation to the reference mandrel is transmitted to a suitable measuring scale.

---

This invention relates to nil gauge devices for machine tools, in particular for setting-up work on milling machines, drilling machines or the like.

Nil gauging devices are known in many forms. Heretofore the ascertainment of the zero position of work on a machine table with sufficient accuracy has only been possible when centering microscopes have been used which must be set direct in the receiving cones of the machine spindles.

This instrument is relatively expensive and sensitive. The greatest cleanliness must be observed in order to prevent the smallest particle of dirt from adhering between the receiving cones which would result in errors in the measurement. Moreover an intermediate check during the working operation involves great loss of time as the clamping means such as the drill chuck, clamping jaws, clamping jaw housing and possibly the adjusting spindles must first be taken out in order to free the receiving cone for the centering microscope.

The use of small dial gauges with pivoting feelers and the corresponding mounting rods must be tested around the work in order to obtain the reference edge from the middle position thus obtained.

This operation is very tedious and complicated and moreover a bore must be available from which to take the reference or if the work is circular the centre of the bore or centre of the work sought in this case must be found by rotating the machine spindle in which the gauging instrument is mounted. This operation is known as circling. The operator must then, like the gauge, go round the work in order to observe the instrument, the dial being readable only from one side. For the circling operation the first mentioned nil gauge must be used.

The invention has for its object to avoid the above mentioned disadvantages. This result is obtained by mounting a reference mandrel adapted to be held in a drill chuck or a clamping jaw rotatably in a housing and arranging on this housing or on the mandrel fixedly and/or movably mounted feelers bearing on the work to be gauged which directly or indirectly effect the movement of the pointer of a measuring scale.

Preferably provision is made that the axis of the mandrel aligns with the axis of the shaft carrying the gauge device and the mandrel thus provides a reference mandrel, about which is rotatably mounted a housing, which at its lower end carries feelers pivotable in two directions over the extended axis of the reference mandrel, the position of which feelers is transmitted by suitable means to a measuring scale.

It is preferred that the feeler is rigidly mounted on the housing and the housing can pivot about a pivot provided at its centre of gravity.

The range of movement of the housing corresponds to the measuring range of the nil gauge. The measurements are therefore provided in a direction differing from the longitudinal axis of the reference mandrel and of the longitudinal axis of the housing. By this arrangement the weight of the housing no longer acts on the feeler so that the latter presses against the work to be gauged under the load of a spring arranged on the indicating pointer.

At the same time the number of bearings, which, due to wear lead to inaccuracies, can be reduced. This can result from the pivotal mounting of the feeler in the housing.

For reading the values measured a measuring scale is provided which in order to ensure simple construction is rigidly mounted on the rotatable and pivotable housing. In a modified construction with a housing which is only rotatable such a mounting is also of advantage.

A further means of simplifying the construction is the pivotal suspension of the housing, the housing with the measuring scale being a means for transmitting the position of the feeler to the scale.

In order to increase the utility of the device the housing is provided with a pivotally mounted feeler and also a fixedly mounted feeler which is in a position to gauge both plane surfaces on the work or to set it on a reference point or is in a position to circle bores. Preferably for the latter purpose a spherical head is formed on the feeler which is movable on the housing.

For transferring variations in the measurements to the scale the reference mandrel in its free lower region is provided with a collar and a lever, mounted in the housing in operative connection with the indicating pointer, bears on this collar.

In order effectively to deal with sudden changes in measurement or great deviations in the reference surfaces as overload safety device is built in between a clamping pin insertable in the drill chuck or in the clamping jaws and the reference mandrel and this overload safety device is formed by pressing on the reference mandrel centrally, a safety housing which in its upper region has an annular undercut, this undercut serving to hold a spring ring which is provided as a connection between the safety housing and a plate-like enlargement arranged on the clamping pin.

By this arrangement the gauging instrument is improved as on small overloads occurring this safety device is released and breakage thus avoided.

Further features of the invention and particular advantages of the invention will appear from the following description and the drawing to which the invention is in no way limited.

In the accompanying drawings:

FIGURE 2 is a side view of the nil gauge device of FIGURE 1, and

FIGURE 3 is a front elevation shown circling a bore.

FIGURE 4 shows a vertical milling and boring machine fitted with the device of the invention.

FIGURES 5 and 6 are modifications of the gauge device, and

FIGURES 7, 8 and 9 illustrate different sections and views of the overload safety device.

Figure 1:
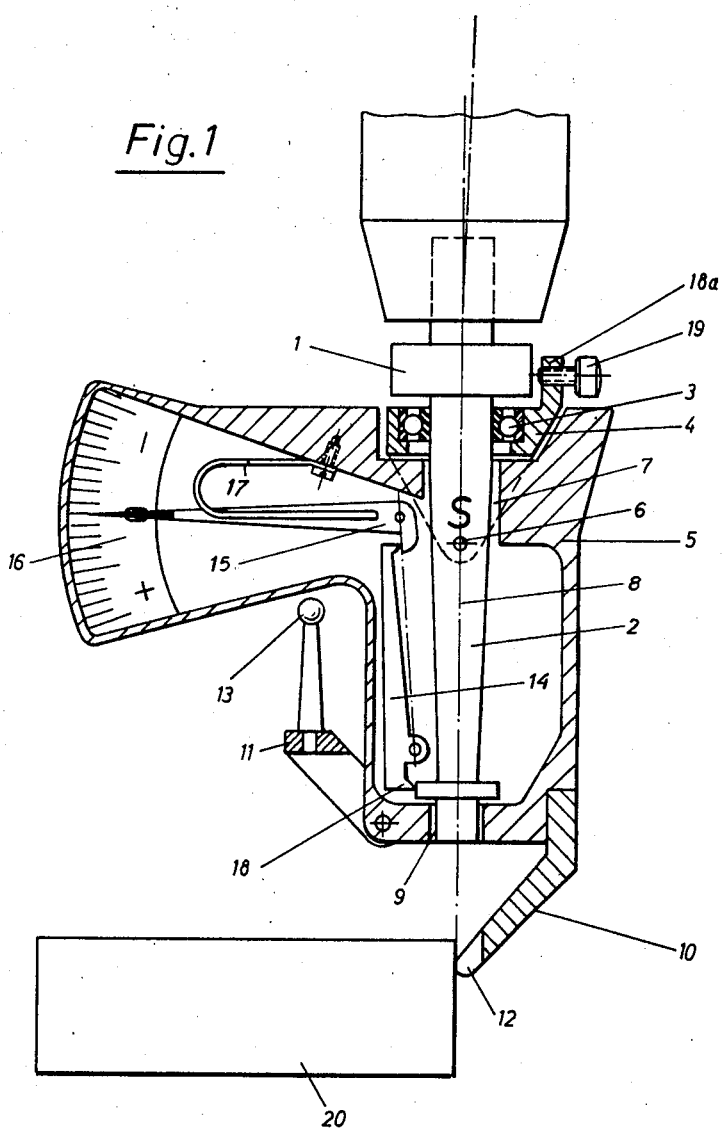
FIGURE 1 is a nil gauge device partly in section.

Referring to the drawings the nil gauge device consists of an overload safety device 1 which will be later described in detail to which a reference mandrel 2 is closely connected. A ball race 4 is connected rotatably with the reference mandrel 2 by ball bearings 3. A housing 5 is connected at its centre of gravity 6 by means of two pivoted straps 7 to the ball race 4 so that it can move pendulum-wise with respect to the axis 8 of the reference mandrel. This movement is limited by the reference mandrel 2 which projects with play into a bore 9 in the housing 5. This play corresponds to the range of measurement of the instrument. If the range is forcibly exceeded the reference mandrel 2 presses on the sides of the bore 9 in the housing 5 and transmit the bending moment to the overload safety device 1. The overload safety device 1 on a small excess of the measuring pressure is immediately released from the reference mandrel 2 so that the load no longer opposes a resistance and thus damage to the instrument is effectively avoided.

To the housing 5 are connected a fixed feeler 10 and a movable feeler 11. The latter ensures by continuous friction a positive inward and outward movement and thus fully meets requirements in circling a bore. The fixed feeler 10 is formed on its gauging face 12 with a small straight edge of great exactitude and acts on the central axis 8 of the reference mandrel 2 in relation to the nil position. The movable feeler has at its free end a spherical head 13 for circling a bore 21.

A feeler system which is arranged inside the housing and in the present instance consists of two simple levers 14, 15, the latter lever 15 acting as a pointer, transmits the moment of movement of the housing 5 to the reference mandrel 2 to a scale 16 which is readable from two sides, i.e. from the front and rear sides. The transmission ratio of the gauge system can be suitably selected corresponding to the exactitude of indication required, for example 1:100 or 1:200.

The measuring pressure of the instrument by reason of the suspension of the casing 5 at its centre of gravity is equally large in any position and is produced by a pretensioned wire spring 17 which acts through the lever arrangement 14, 15 of the gauge system on the reference mandrel 2 and thus also acts on the feelers 10, 11 through the housing 5. The stop for preventing rotation of the instrument about the axis 8 of the mandrel should also be referred to. This is necessary when a hole or a circular piece of work is to be transversed which is just like testing the track over its entire periphery. For this purpose a screw 19 is provided on an upturned lug 18a on the ball race 4.

The feeler system which transmits the dimension formed and makes it visible on the indicator 16 could also be arranged pneumatically or electrically. Also the indicator 16 could be arranged separately and coupled only by a suitable connecting member.

The determination of the zero position of a reference edge 22 of work 20 is very simple. This will be understood from the following example (FIGURE 4). On a Universal milling machine drilling is to be carried out. The work 20, for example, a rectangular steel plate, is firmly secured to a machine table 24. In a drill chuck 25 of a vertical milling and boring head 26 the nil gauge is firmly secured. The work 20 is now displaced by moving the table 24 in the longitudinal direction towards the feeler until the straight edge-like feeler lug 12 of the fixed feeler 10 bears on the work 20. If further movement is made the pointer 15, which in the inoperative position lies entirely on the minus side of the scale 16, is moved towards the zero mark. If the spindle 27 of the vertical head 26 is now rotated once by hand, the pointer 15 will move corresponding to the eccentricity of the drill chuck 25 or to the error in setting. Now it is only necessary to shift the table 24 with the work 20 until the movement of the pointer 15 to the plus and minus sides are alike. The scale on a scale barrel 28 of the machine table 24 can now be set to zero as the central axis of the vertical head 26 is in exact alignment with the work edge 22. It will thus be seen that since the location of the feeler 10 to the axis of the reference mandrel 8 and also the eccentricity of the reference mandrel 2 to the machine spindle 27 is indicated a very exact nil setting is possible.

Assume, as an example, that a group of holes are to be centered at definite distances apart from the reference edge. During the time taken on the work, an intermediate test is necessary due to thermal expansion or because the scale of the selective moving device has shifted or the work must be re-set. Now it is only necessary in place of the centering drill to clamp on the nil gauge, to test the nil position and if necessary to correct it and proceed with the work.

In the construction shown in FIGURE 5 the same principle is used as in FIGURE 1. The difference resides solely in this that the housing 29 of the instrument is mounted for rotation about the reference mandrel 30. Moreover the straight edge feeler 31 forms the first part of the lever transmission. Just as in the construction shown in FIGURE 1, the position of the feeler lug 31 in relation to the zero mark and eccentricity of the reference mandrel 30 to the axis of the machine spindle are determined. In this form the reference mandrel is guided in two bearings 32, 33.

Figure 6:
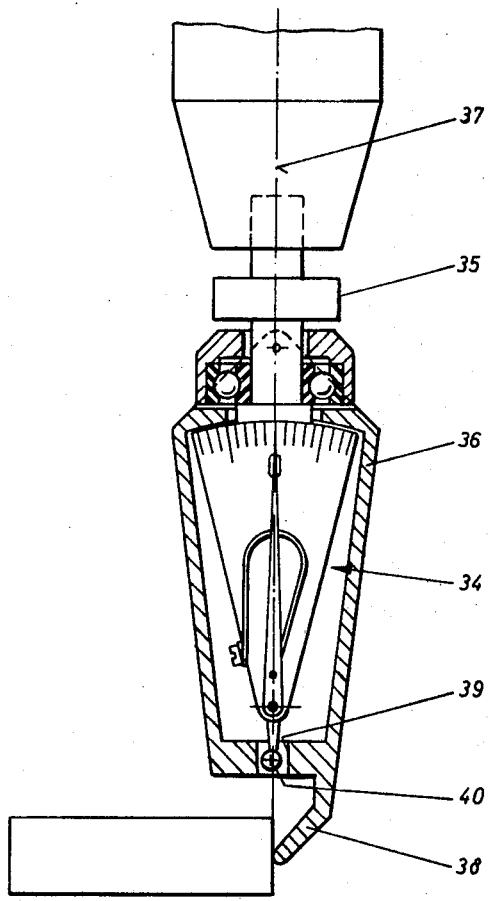

In the embodiment shown in FIGURE 6 in place of the reference mandrel a gauge system 34 is connected with an overload safety device 35. A housing 36 is also rotatably and pivotally connected with the axis 37 of the instrument as in FIGURES 1 and 5. A feeler 38 is rigidly connected with the housing 36. Adjacent the feeler 38 is located a reference bore 39 in the housing 36. The gauge system 34 has a spherical head 40 which enters the reference bore 39. The position of the feeler lug 38 in relation to the zero mark as also of the instrument axis to the axis 37 of the machine spindle can thus again be indicated.

Figure 7:
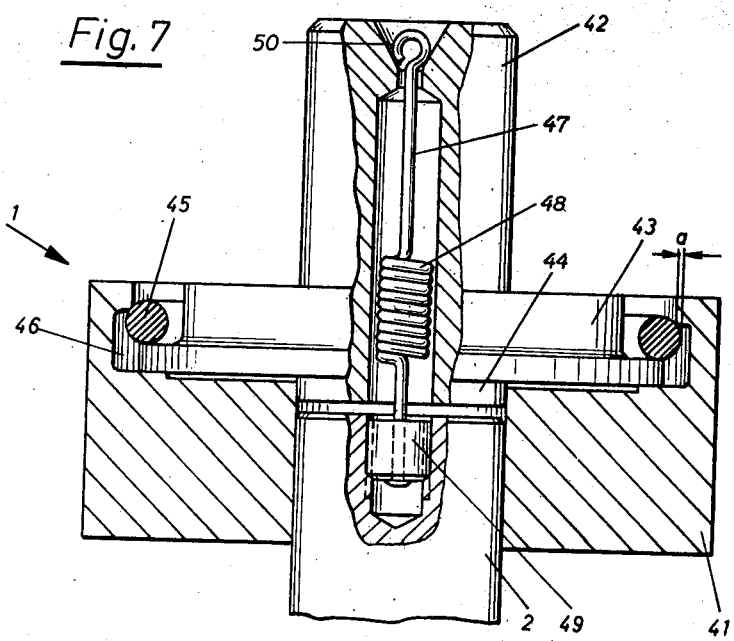
Figure 9:
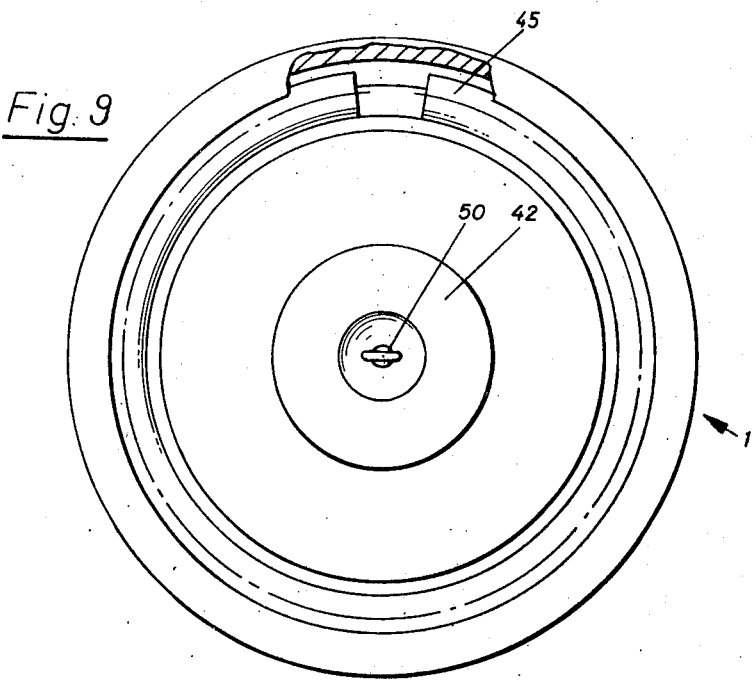

In FIGURES 7, 8 and 9 is illustrated an overload preventing device 1. This consists of a safety housing 41 which is exactly plane and pressed on to the reference mandrel 2. The safety housing 41 is connected by means of a spring ring 45 with free play with a setting pin 42 which in its lower part 43 is plate-shaped and, to ensure exact centering, is formed with a short pin 44. The spring ring 45 is of round cross section and is pre-tensioned corresponding to the bending movement on which the connection will be released. The safety housing 41 at the contact point of the spring ring has a claw-like undercut 46 and allows the spring ring 45 to enter the housing only by an amount $a$. The amount $a$ must be kept within the usual 45° limit for sliding friction.

In order to prevent the safety housing 41, and with it the measuring instrument, from falling, a safety wire 47 is provided. This consists of a weak wire with a few coils 48 located within the setting pin 42 and soldered at its lower end into a screw-threaded nipple 49 by which it can be screwed into the reference mandrel. The upper end of the safety wire 47 is provided with an eye 50 which is formed after assembly. During an overloading operation the coils 48 are simply drawn apart slightly but a reliable connection is maintained which will support many times the weight of the instrument.

In order to render the overload safety device operative again one need only insert the pin 42 into the safety housing 41 and insert the spring ring 45 into the lower part 43. This operation can be repeated as often as required without adversely affecting the safety device 1.

By this nil gauge device exact operation on machine tools is facilitated and a great saving in time obtained.

What is claimed is:

1. A nil gauge for setting up a work piece in a machine tool which has a machine-tool axis, the nil gauge comprising in combination:
 a mandrel having a first portion and a distal portion, the first portion adapted to be held in the machine tool, the mandrel having a mandrel axis coaxial with the machine-tool axis;

a bearing assembly rotatably connected to the first portion of the mandrel about the mandrel axis;

a housing having a first portion and a distal portion with the first portion of the housing engaging the bearing assembly so that the first portion of the housing is rotatably mounted about the mandrel axis, the distal portion of the housing pivotally connected to and depending from the first portion of the housing by means of a link provided at the distal portion of the housing's center of gravity;

the distal portion of the housing having a distal end which is provided with a bore, the mandrel penetrating through the bore and spaced from the bore to define an annulus whereby the amount of play corresponding to the measuring range of the nil gauge is limited by the size of the annulus;

a feeler rigidly connected to the distal portion of the housing and arranged to be pivotable in a plane which includes the mandrel axis;

means for indicating the position of the feeler relative the mandrel axis on a measuring scale and comprising a lever mounted on the housing and arranged to cooperate with a pointer operatively associated with the measuring scale.

2. The nil gauge of claim 1 with a spring arranged to oppose movement of the pointer.

3. A nil gauge as claimed in claim 2 in which the distal end of the housing is provided with a second feeler having a spherical head, the second feeler pivotally connected to the distal end of the housing to be moveable between an inoperative position wherein the second feeler does not engage the work piece and an operative position wherein the second feeler is in position to engage a bore of the work piece for circling.

4. A nil gauge as claimed in claim 3 in which the bearing assembly includes an inner channel connected to the mandrel and an outer channel connected to the first portion of the housing, the outer channel provided with a lug which is adapted to receive a screw for engaging the mandrel to lock the first portion of the housing onto the mandrel against any relative rotation about the mandrel axis.

5. A nil gauge for setting up a work piece in a machine tool which has a machine-tool axis, the nil gauge comprising in combination:

a mandrel having a first portion and a distal portion, the first portion adapted to be held in the machine tool, the mandrel having a mandrel axis coaxial with the machine-tool axis;

a first bearing assembly rotatably connected to the first portion of the mandrel about the mandrel axis and a distal bearing assembly connected to the distal portion of the mandrel about the mandrel axis;

a housing having a first portion and a distal portion engaging the first bearing assembly and the distal bearing assembly respectively so that the housing is rotatably mounted about the mandrel axis;

a feeder pivotally connected to the housing and arranged to be pivotable in a plane which includes the mandrel axis;

means for indicating the position of the feeler relative the mandrel axis on a measuring scale rigidly connected to the housing and comprising a lever arm connected to the feeler, a pointer operatively connected to the lever arm and operatively associated with the measuring scale.

6. A nil gauge for setting up a work piece in a machine tool which has a machine-tool axis, the nil gauge comprising in combination:

a mandrel adapted to be held in the machine tool and having an axis coaxial with the machine-tool axis, a ball bearing assembly rotatably connected to the mandrel about the mandrel axis, a housing having a first portion and a distal portion with the first portion of the housing engaging the ball bearing assembly so that the first portion of the housing is rotatably mounted about the mandrel axis, the distal portion of the housing pivotally connected to and depending from the first portion of the housing, a feeler rigidly connected to the distal portion of the housing and means for arranging the feeler to be pivotable in a plane which includes the mandrel axis, a measuring scale mounted on the first portion of the housing for indicating the position of the feeler relative the mandrel axis, a lever mounted on the distal portion of the housing and connected to a pointer which in turn is arranged for movement across the measuring scale, a spring connected between the first portion of the housing and the pointer.

7. A nil gauge for setting up a work piece in a machine tool which has a machine-tool axis, the nil gauge comprising in combination:

a mandrel having a first portion and a distal portion, the first portion adapted to be held in the machine tool, the mandrel having a mandrel axis coaxial with the machine-tool axis;

a ball bearing assembly rotatably connected to the first portion of the mandrel about the mandrel axis;

a housing having a first portion and a distal portion with the first portion of the housing engaging the ball bearing assembly so that the first portion of the housing is rotatably mounted about the mandrel axis, the distal portion of the housing pivotally connected to and depending from the first portion of the housing by means of a link provided at the distal portion of the housing's center of gravity;

the distal portion of the housing having a distal end which is provided with a bore, the mandrel penetrating through the bore and spaced from the bore to define an annulus whereby the amount of play corresponding to the measuring range of the nil gauge is limited by the size of the annulus;

a feeler rigidly connected to the distal portion of the housing and arranged to be pivotable in a plane which includes the mandrel axis;

means for indicating the position of the feeler relative the mandrel axis on a measuring scale and comprising a collar formed by the mandrel in the vicinity of its distal end and defining a cylindrical surface arranged about the mandrel axis, a lever mounted on the housing and arranged to bear on the cylindrical surface of the collar, a pointed operatively connected to the lever and operatively associated with the measuring scale.

References Cited

UNITED STATES PATENTS

| | | | |
|---|---|---|---|
| 3,115,710 | 12/1963 | Blake | 23—172 |
| 2,701,147 | 2/1955 | Summerville | 285—1 |
| 2,533,198 | 12/1950 | Radtke | 33—172 |
| 2,226,826 | 12/1940 | Miller | 285—30 |

FOREIGN PATENTS

| | | |
|---|---|---|
| 1,028,792 | 1958 | Germany. |
| 921,718 | 1954 | Germany. |

WILLIAM D. MARTIN, JR., Primary Examiner

U.S. Cl. X.R.

33—181